United States Patent [19]

West

[11] 4,176,082
[45] Nov. 27, 1979

[54] CLOSED SMOKE GENERATING APPARATUS

[76] Inventor: Clarence W. West, 208 S. La Salle St., Chicago, Ill. 60604

[21] Appl. No.: 796,629

[22] Filed: May 13, 1977

[51] Int. Cl.$^2$ .................................................. A23B 4/04
[52] U.S. Cl. ................................. 252/359 A; 99/473
[58] Field of Search .............. 252/359 A; 202/263; 201/19; 99/471, 473–475, 482

[56] References Cited

U.S. PATENT DOCUMENTS

| | | | |
|---|---|---|---|
| 1,811,191 | 6/1931 | Taylor | 252/359 A |
| 2,914,059 | 11/1959 | Eddison | 252/359 A |
| 3,502,846 | 3/1970 | Porwancher | 252/359 A |
| 3,513,823 | 5/1970 | Fessmann | 99/473 |

Primary Examiner—Hiram H. Bernstein
Attorney, Agent, or Firm—Thomas F. Peterson

[57] ABSTRACT

A closed smoke generating apparatus isolated from the atmosphere is provided in which carrier gases from an associated closed air food processing system are introduced into a smoke collection chamber, mixed with smoke supplied from a separate distillation chamber mounted therebelow. Smoke and carrier gases are discharged through an outlet in the collection chamber directly into the closed air food processing system. Wood sawdust or other organic particulate materials are continuously fed into the elongated distillation chamber and are carried by a rotating auger. A heat source surrounds the distillation chamber for destructive distillation of the particulate materials without introduction of air into or leakage of air from the distillation chamber. A residue discharge is provided with means to seal the outlet end of the distillation chamber. Smoke ports or conduit means provide direct communication between the distillation chamber and the smoke collection chamber. Auxiliary heating means can be provided for the smoke conduit means to reduce deposition of distillation by-products. Further auxiliary heating means can be provided in the collection chamber to minimize deposition of unwanted distillation by-products and also to accelerate flow of smoke and carrier gases through the closed system. The arrangement of the smoke collection chamber directly above the smoke distillation chamber and substantially parallel therewith provides an efficient apparatus for mixing and supplying smoke with carrier gases into the closed air food processing system. The collection chamber can be of varying size or cross-sectional configuration without requiring a change in the construction of the lower distillation chamber. The collection chamber has a door providing access to the smoke port conduits and to the collection chamber itself for cleaning and maintenance. A layer of insulation substantially encloses the distillation chamber, and a separate insulation layer can surround the smoke collection chamber.

6 Claims, 1 Drawing Figure

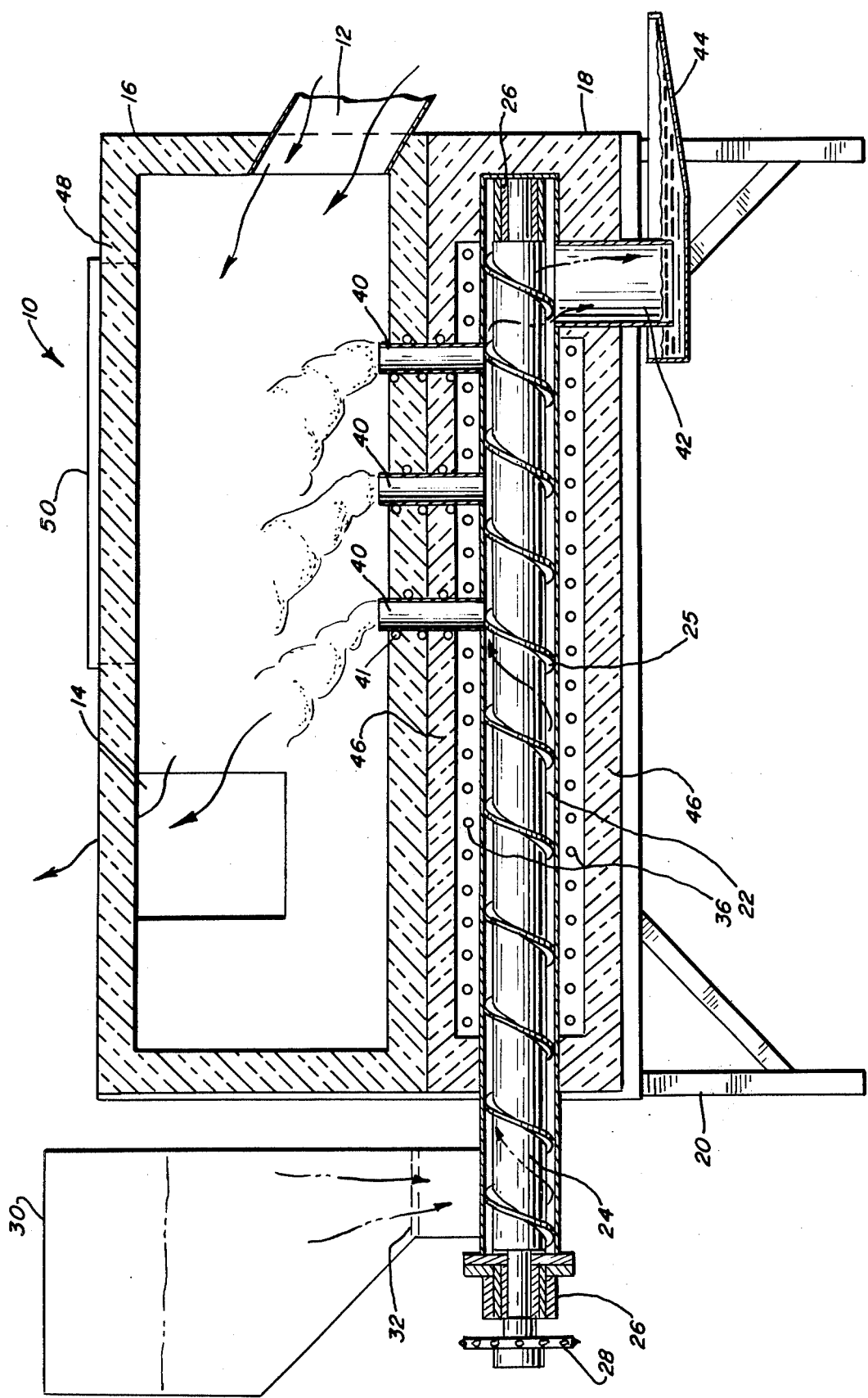

CLOSED SMOKE GENERATING APPARATUS

BACKGROUND OF THE INVENTION

The invention concerns a closed smoke generating apparatus for generating smoke from wood sawdust or other organic particulate materials by avoiding open combustion. It is especially suitable for use with a closed air food processing system which is independent of outside air temperature and humidity conditions.

In utilizing a completely closed air food processing system for treating and smoking food products, such as ham, bacon, sausage, fish and the like, a major problem is effectively introducing traditional wood smoke for processing such foods. Known smoke generating means, however, all have operated on an open principle requiring introduction of at least some outside air. This manner of generating smoke would be totally unsuitable for use in a closed processing system, which operates independently of outside conditions and ordinarily at a pressure above atmospheric pressure. Thus, an object of this invention is the provision of an efficient, self contained, closed smoke generating apparatus which can be incorporated as an integral part of a closed air food processing apparatus.

SUMMARY OF THE INVENTION

The invention provides an improved closed smoke generating apparatus which continuously creates a supply of smoke from an elongated distillation chamber wherein sawdust or other organic particles are destructively distilled without introduction of outside air or leakage of gases from the distillation chamber. Smoke port means are provided for direct communication with an elongated, parallel smoke collection chamber mounted above the distillation chamber and in which there is a carrier gas inlet and a smoke and gas outlet spaced from the inlet. This closely adjacent arrangement of the distillation chamber below the collection chamber provides for direct flow of smoke generated in a distillation chamber for mixing with carrier gas and is particularly suitable for introduction into a return means within a closed air food processing system, for example, as described in my U.S. Pat. No. 3,805,686, granted Apr. 23, 1974.

Auxiliary heating means can be arranged on smoke conduits interconnecting the parallel and the closely adjacent collection chamber and distillation chamber to accelerate smoke flow therethrough and also to minimize deposition of smoke by-products therein. Further auxiliary heating means can be arranged in the collection chamber above the distillation chamber to further accelerate flow of smoke and gases and also to minimize deposition of distillation by-products within the collection chamber. While the collection chamber is isolated from the distillation chamber, an access panel or door is provided for ease of maintenance and cleaning the smoke ports and the collection chamber.

The distillation chamber includes an auger closely fitted for rotation therein, and a feed device which can take the form of a hopper or other suitable means for continuously supplying sawdust or other particulate materials by rotation of the auger into the distillation chamber. A heat source in the form of electrical heating elements, gas burners or other suitable means are mounted closely adjacent the distillation chamber for direct application of intense heat to the elongated tube and rotating auger for destructive distillation of sawdust or other particulate materials being carried therein. Smoke is generated thereby and flows out through smoke exhaust conduits leading directly to an elongated smoke collection chamber mounted directly above the distillation chamber. The collection chamber can conveniently be of rectangular cross section or could be an elongated cylindrical tube, for example. The collection chamber has an access door to provide access for maintenance of the smoke conduits as well as the collection chamber. A layer of insulation is provided around the distillation tube and separate insulation is provided for the collection chamber. Auxiliary heating means can be provided for the smoke conduit means and/or in the smoke collection chamber to help accelerate flow of smoke and gases and to minimize deposit of smoke distillation by-products on the interior surfaces thereof.

The sawdust entering the distillation chamber becomes compressed by the rotating auger to provide an effective seal preventing leakage of air into or out of the distillation chamber. A residue discharge at the opposite end of the distillation tube also includes means to seal the outlet from leakage of air into the chamber, such as a water seal.

BRIEF DESCRIPTION OF THE DRAWING

The accompanying drawing is a schematic illustration of a preferred embodiment of the invention.

DETAILED DESCRIPTION

The following detailed description of the invention is intended to convey a clear understanding of the inventive concept, but it will be understood to be exemplary of other embodiments not specifically illustrated or described, but within the scope of the invention as particularly set forth in the accompanying claims.

Referring now to the drawing there is illustrated a smoke generating apparatus 10 shown in elevation and in partial cross-section. The apparatus is particularly adapted for use with an associated closed air food processing system (not shown) having a processing chamber into which smoke and carrier gases are supplied from the generating apparatus 10. Carrier gases are drawn from the processing system and supplied into the smoke generating apparatus through an inlet duct 12 and after being mixed with the smoke generated within the apparatus the gases and smoke are discharged through an outlet opening 14 for supply into the associated closed food processing system. For a more complete description of the preferred closed system with which the present smoke generating apparatus is intended to function, reference is hereby made to the above-noted U.S. Pat. No. 3,805,686, granted Apr. 23, 1974, and entitled "Air Pollution Control System for Food Processing Apparatus."

The carrier gases and smoke are mixed in an upper housing 16 defining a collection chamber from which the air and smoke are carried through the associated system. The chamber 16 may have a rectangular cross-section or could be fabricated with a cylindrical shape if desired. Mounted directly beneath the collection chamber is a smoke generating chamber 18 which in turn is mounted upon a suitable support frame 20. The lower chamber 18 is preferably of a cylindrical shape containing therein an elongated distillation tube 22. Mounted within the distillation tube is a rotatable feed auger 24 having at least one spiral thread 25. While only one such thread has been illustrated and is shown as having a constant pitch it will be understood that one or more additional threads could be provided and that the pitch can be varied from end to end, progressively decreasing from one end to the other.

At each end of the distillation tube 22 is a bearing 26 arranged for rotatable mounting of the auger 24 therein. Adjacent to the bearing at one end is a drive sprocket 28 adapted for connection to a suitable drive mechanism (not shown).

Adjacent the one end of the distillation tube 22 is mounted a feed supply device which preferably is in the form of a hopper 30 containing a supply of sawdust or other particulate organic materials. A suitable feed control 32 is provided adjacent the lower portion of the hopper 30 to adjust the supply of sawdust from the hopper into the distillation tube. This can take the form of a damper or other suitable mechanical control. Alternatively, the sawdust or particulate materials can be fed into the distillation tube by other means including a pneumatic supply arrangement (not shown).

The sawdust or particulate materials are continuously fed into the distillation tube and as the auger 24 is rotated the sawdust becomes tightly compressed thereby creating an efficient air seal adjacent the inlet to prevent leakage of air into or out of the distillation tube.

Surrounding the mid-portion of the distillation tube 22 is a heat source 36. The source of heat can be a series of electrical heating elements or gas burners or other suitable means which are mounted closely adjacent to the distillation chamber for direct application of heat to the elongated distillation tube as well as to the rotatable auger 24 for destructive distillation of the sawdust or particulate materials being carried therealong. Intense smoke is generated by the distillation of the sawdust and flows out from the tube via a plurality of vertically arranged smoke conduits or port means 40 extending vertically from the tube upwardly into the collection chamber 16 mounted thereabove. The arrangement is such that smoke generated in the distillation tube 22 will be conducted upwardly through the smoke port means 40 directly into the separate collection chamber 16 for mixing with carrier gases entering the inlet 12 and passing through the outlet 14, as part of the return means in the associated closed food processing system described above.

At the end of the distillation tube remote from the inlet end is a discharge conduit 42 extending downwardly and through which solid residue in the form of particulate matter can be conveniently discharged from the distillation tube. Conduit 42 extends downwardly with an open lower end sealed from the atmosphere by means of a water trap 44 which can be of any suitable conventional design.

In the preferred embodiment the distillation tube 22 and heating elements 36 are surrounded by a layer of insulation 46 to prevent unwanted heat loss and to improve efficiency. Thus, heat is conducted directly to the tube for destructive distillation of the sawdust or other particulate material being carried by the rotating auger 24.

It is also preferred that the separate smoke collecting chamber 16 be provided with a suitable layer of insulation 48 to improve efficiency of the smoke generating apparatus. Collection chamber 16 also can be provided with an access panel or hinged door 50 to provide easy access into the collection chamber for cleaning and maintenance as well as to provide direct access to the smoke conduit port means 40.

Additional heating elements 41 can be provided around each of the smoke conduit ports 40 to improve efficiency in the flow of smoke through the conduits and also to minimize the buildup of residual materials on the inside surfaces thereof. Other heat source elements (not shown) can be provided in or around the upper collection chamber to assist in the flow of air and smoke through the apparatus and also to minimize the deposit of unwanted distillation products contained in the smoke on the interior walls of the collection chamber. By arranging the collection chamber directly above the smoke generating chamber 18 and by isolating the flow of generated smoke only through the smoke ports 40 upwardly into the collection chamber 16 there will be no undesirable deposits of distillation products in and around the heating elements which surround the distillation tube 22. This preserves the efficient operation of the apparatus and minimizes the amount of time necessary for cleaning or maintenance of the apparatus. Thus the smoke generator can operate for longer periods of time on a substantially continuous basis for the destructive distillation of sawdust or other materials, particularly useful in the closed food processing system with which the invention is intended to function.

It will be appreciated that what has been described as a preferred embodiment of a totally enclosed smoke generating apparatus utilizing traditional sawdust or other particulate materials for producing wood smoke which is useful in the processing of certain foods. The system has been found to be extremely economical by virtue of the ability to use traditional wood sawdust but without the problems of open combustion. At the same time the closed smoke generator preserves the integrity of the closed air food processing system with which it is intended to operate such that the apparatus becomes an integral system which is isolated from and independent of outside temperature and humidity conditions. As a consequence the treated food products utilizing the smoke generated by the invention have a much more uniform quality than has been attainable in the past. Moreover air pollution is avoided because the smoke and distillation by-products are not discharged into the atmosphere.

What is claimed is:

1. A closed smoke generating apparatus isolated from the atmosphere for destructive distillation of particulate materials, comprising:
   (a) a pair of elongated housings arranged one above the other, closely adjacent and substantially parallel;
   (b) conduit means interconnecting said housings to provide at least one smoke passageway from the lower housing directly into the upper housing;
   (c) means for continuously feeding organic particulate materials into one end of the lower housing without leakage of air into or out of said one end of said lower housing, including
      (i) a feed device arranged to continuously supply said particulate materials to said one end of said lower housing,
      (ii) a rotatable elongated feed auger mounted in said lower housing for advancing said materials from said one end toward the other end of said lower housing, and
      (iii) means for rotating said auger;
   (d) means providing a source of heat surrounding a portion of said lower housing downstream of said one end for generating smoke by destructive distillation of said particulate materials;

(e) means connected to said other end of said lower housing for discharging residual matter from said lower housing without leakage of air into or out of said other end;

(f) the upper housing comprising a smoke collection chamber, including
  (i) inlet means adapted to receive a supply of carrier gas, and
  (ii) outlet means spaced from said inlet means and adapted to discharge smoke mixed with said carrier gas from said upper housing.

2. Apparatus according to claim 1, wherein said upper and lower housings are horizontally mounted on a support frame, said upper housing being directly mounted upon said lower housing and having means to provide access to the interior of said upper housing and to said conduit means.

3. Apparatus according to claim 1, including auxiliary means for heating said conduit means to minimize deposition of smoke distillation by-products in said conduit means.

4. A closed smoke generator apparatus isolated from the atmosphere for destructive distillation of solid particles, sawdust, or the like, comprising:

(a) a distillation chamber in the form of an elongated cylindrical tube, having an inlet section at one end thereof, a residue outlet section at the opposite end thereof, and a distillation section therebetween;

(b) a rotatable feed auger mounted within said distillation tube and having a cylindrical body portion with at least one spiral thread integral therewith and closely fitted within said cylindrical tube;

(c) drive means adjacent the inlet section of said distillation chamber and connected to rotate said feed auger;

(d) a feed device directly connected to said inlet section of said distillation chamber for continuous supply of organic particles into said distillation chamber upon rotation of said feed auger substantially without introduction of air into said chamber or leakage of gases back through said inlet section;

(e) a heat source surrounding a portion of said distillation chamber defining said distillation section and adapted to conduct heat to said tube and said auger for destructive distillation of said organic particles and generation of smoke;

(f) a residue discharge connected to the outlet section of said distillation chamber including seal means to prevent leakage of air into said distillation chamber;

(g) said distillation section of said cylindrical tube being connected to at least one smoke exhaust port means;

(h) a smoke collection chamber in the form of an elongated housing mounted directly above said smoke exhaust port means, and closely adjacent and substantially parallel to said distillation chamber;

(i) said smoke exhaust port means providing a direct passage from said distillation chamber to said smoke collection chamber;

(j) said smoke collection chamber having a carrier gas inlet and a smoke delivery outlet spaced from said inlet, whereby smoke generated in said distillation chamber passes through said port means directly into said collection chamber.

5. Apparatus according to claim 4, wherein said collection and distillation chambers are horizontally mounted on a support frame, said collection chamber being mounted directly above said distillation chamber and having means to provide access to the interior of said collection chamber and to said port means.

6. Apparatus according to claim 4, including auxiliary means for heating said port means to minimize deposition of smoke distillation by-products in said port means.

* * * * *